United States Patent
Matsumoto et al.

(10) Patent No.: US 12,470,138 B2
(45) Date of Patent: Nov. 11, 2025

(54) LOAD CONTROL DEVICE, LOAD CONTROL SYSTEM, AND LOAD CONTROL METHOD

(71) Applicant: Nissan Motor Co., Ltd., Kanagawa (JP)

(72) Inventors: Takashi Matsumoto, Kanagawa (JP); Kosuke Tomita, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/562,741

(22) PCT Filed: May 25, 2021

(86) PCT No.: PCT/JP2021/019814
§ 371 (c)(1),
(2) Date: Nov. 20, 2023

(87) PCT Pub. No.: WO2022/249284
PCT Pub. Date: Dec. 1, 2022

(65) Prior Publication Data
US 2024/0186896 A1    Jun. 6, 2024

(51) Int. Cl.
*H02M 3/155* (2006.01)
*B60R 16/023* (2006.01)

(52) U.S. Cl.
CPC ......... *H02M 3/155* (2013.01); *B60R 16/0231* (2013.01)

(58) Field of Classification Search
None
See application file for complete search history.

(56) References Cited

U.S. PATENT DOCUMENTS

| | | | | |
|---|---|---|---|---|
| 5,859,845 A | * | 1/1999 | Oniishi | B60R 16/0315 370/386 |
| 5,978,352 A | * | 11/1999 | Imaizumi | B60R 16/0315 340/3.3 |

(Continued)

FOREIGN PATENT DOCUMENTS

| | | |
|---|---|---|
| JP | 2000-224762 A | 8/2000 |
| JP | 2002-312040 A | 10/2002 |

(Continued)

OTHER PUBLICATIONS

Simac Electronics Handel Gmbh: "JT-DPM8600 Programmierbares Labornetzteil", Jul. 23, 2019 (Jul. 23, 2019), ages 1-10, XP093188411, Retrieved from the Internet: URL :<https://asset.conrad.com/media10/add/160267/c1/-/de/002149765ML01/bedienungsanle>itung-2149765-joyit-dpm8605-labornetzgeraeteinstellbar-0-60-v-0-5-a-300-w-ttlcmos-fernsteuerbarprogrammierbar-schmalebaufo.pdf [retrieved on Jul. 21, 2024] (17 pages).

*Primary Examiner* — Jeffrey S Zweizig
(74) *Attorney, Agent, or Firm* — Osha Bergman Watanabe & Burton LLP

(57) ABSTRACT

A load control device includes a device that has a plurality of operation modes depending on applications and is electrically connected to a load. The device includes an operation mode determination circuit. The operation mode determination circuit is configured to: set a tentative operation mode indicating the operation mode before determination; obtain operation mode information regarding the operation mode via communication, the operation mode information including an error detection code for detecting an error of the tentative operation mode; determine whether or not a setting result of the tentative operation mode is correct using the error detection code; and determine the operation mode of the device based on a determination result.

14 Claims, 11 Drawing Sheets

(56) References Cited

U.S. PATENT DOCUMENTS

| | | |
|---|---|---|
| 2010/0214317 A1 | 8/2010 | Miura et al. |
| 2011/0260691 A1 | 10/2011 | Ishibashi et al. |
| 2019/0364629 A1 | 11/2019 | Newman, Jr. et al. |

FOREIGN PATENT DOCUMENTS

| | | |
|---|---|---|
| JP | 2011-229306 A | 11/2011 |
| JP | 2014-128147 A | 7/2014 |
| JP | 2015-027211 A | 2/2015 |
| JP | 2017-073942 A | 4/2017 |

\* cited by examiner

LOAD CONTROL DEVICE, LOAD CONTROL SYSTEM, AND LOAD CONTROL METHOD

TECHNICAL FIELD

The present invention relates to a load control device, a load control system, and a load control method.

BACKGROUND ART

There is known a load control device that controls loads mounted on a vehicle (Patent Document 1).

PRIOR ART DOCUMENT

Patent Document

Patent Document 1: JP-A-2002-312040
Patent Document 2: JP-A-2000-224762

SUMMARY OF INVENTION

Problems to be Solved by Invention

In the prior art, a device for driving a load is required for each application, and thus, types of devices increase. On the other hand, when a plurality of functions depending on the applications are disposed in a device to reduce the types of the devices, there is a problem that possibility that the device will malfunction increases.

The problem to be solved by the present invention is to provide a load control device, a load control system, and a load control method that suppress a device having a plurality of functions depending on the applications from malfunctioning.

Means for Solving Problems

The present invention solves the above-described problem by setting a tentative operation mode indicating an operation mode before determination to a device that has a plurality of operation modes depending on the applications and is electrically connected to loads, obtaining operation mode information related to the operation mode via communication, and determining the operation mode of the device based on the obtained operation mode information and the tentative operation mode.

Effects of Invention

According to the present invention, it is possible to suppress a device having a plurality of functions depending on the applications from malfunctioning.

MODE(S) FOR CARRYING OUT THE INVENTION

The following describes embodiments of the present invention based on the attached drawings.

Figure 1:
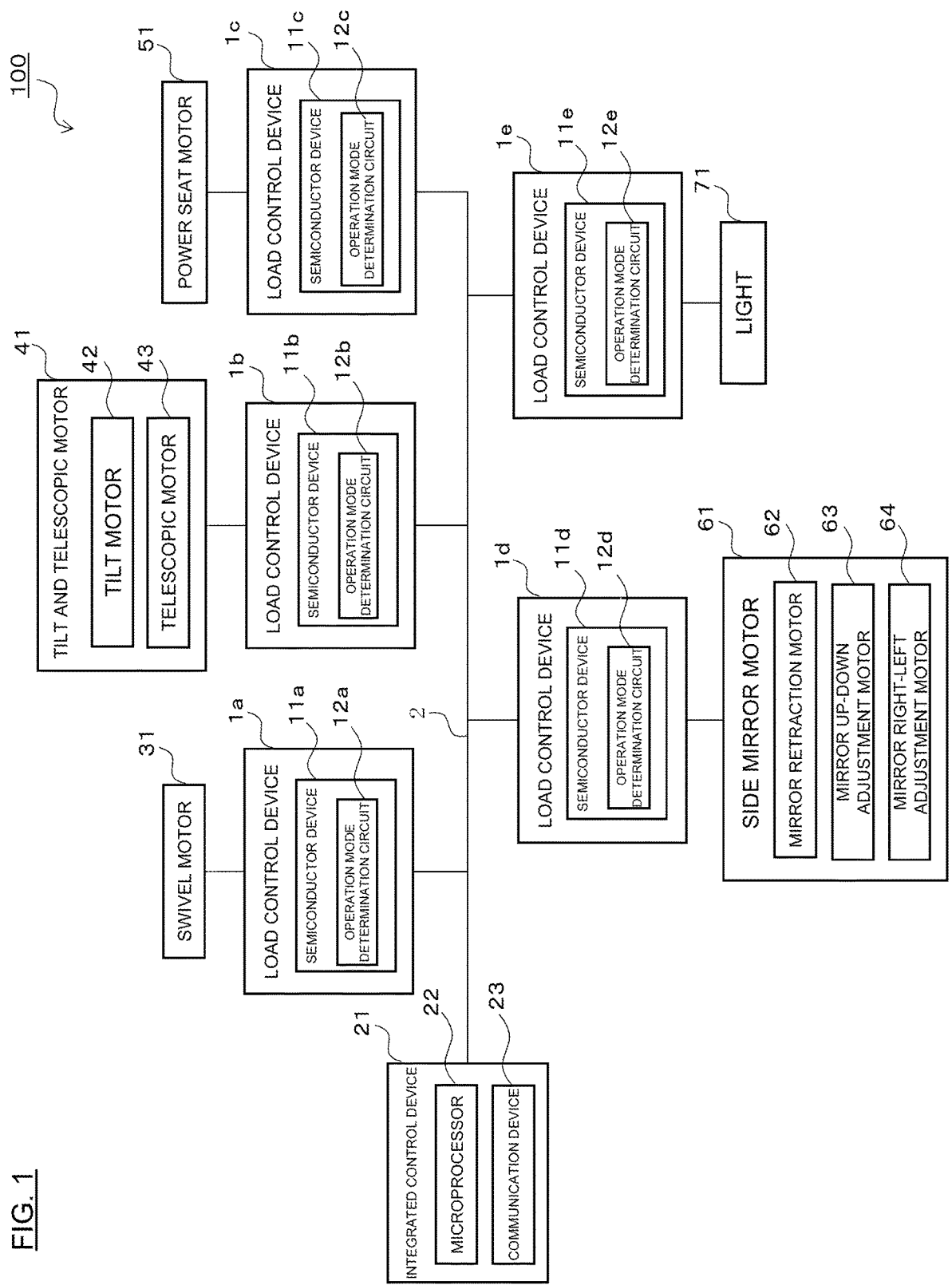
FIG. 1 is one example of a block configuration diagram of a load control system including a load control device according to this embodiment.

FIG. 1 is one example of a block configuration diagram of a load control system according to the embodiment of the present invention. A load control system 100 illustrated in FIG. 1 is an in-vehicle system mounted on a vehicle. A driving source and a subject of driving control of the vehicle on which the load control system 100 is mounted are not specifically limited. For example, the load control system 100 can be mounted on any of gasoline automobiles, hybrid automobiles, or electric automobiles. For example, the load control system 100 can be mounted on any of a vehicle traveling by driving of a driver, a vehicle traveling by driving assistance assisting driving of a driver in addition to the driving of the driver, and a vehicle traveling by an autonomous traveling system without a driver being involved in driving.

The load control system 100 illustrated in FIG. 1 is a system that controls, what is called, body system loads that are loads unrelated to driving, braking, and steering of a vehicle among a plurality of loads mounted on a vehicle. While, in this embodiment, a description will be given by taking a swivel motor 31, a tilt and telescopic motor 41, a power seat motor 51, a side mirror motor 61, and a light 71 as examples of loads controlled by the load control system 100, the load control system 100 may control loads other than the loads illustrated in FIG. 1. The number of loads that the load control system 100 controls is not specifically limited. In the following description, while these motors and lights will be described by being referred to as "load," the name portion of "load" may be replaced with the name of "actuator."

As illustrated in FIG. 1, the load control system 100 includes a load control device 1a to a load control device 1e, an integrated control device 21, the swivel motor 31, the tilt and telescopic motor 41, the power seat motor 51, the side mirror motor 61, and the light 71. The integrated control device 21 is connected to each load control device by, for example, an in-vehicle network 2, such as a Controller Area Network (CAN) and a Local Interconnect Network (LIN) in order to transmit and receive information with one another. As illustrated in FIG. 1, each load control device is electrically connected to the load. Each load control device is disposed in a periphery of the load of a connection destination, and, for example, the load and the load control device are disposed on the same substrate.

An outline of the load control system 100 will be described. In the load control system 100, the integrated control device 21 functions as a control tower for controlling each load. The integrated control device 21 outputs a control signal for controlling the load of the connection destination to each load control device via the above-described communication. As will be described later, a circuit configuration and a connection with the load control device of each load illustrated in FIG. 1 differ for each load. Thus, the integrated control device 21 generates the control signal depending on the application of each load control device. Taking the load control device 1a as an example, the integrated control device 21 generates a control signal for controlling the swivel motor 31 and outputs the generated control signal to the load control device 1a. On the other hand, the integrated control device 21 does not output the control signal for controlling the swivel motor 31 to the load control device 1b to the load control device 1e. When the control signal for controlling the swivel motor 31 is input into the load control device 1a from the integrated control device 21, the load control device 1a controls the swivel motor 31 based on the input control signal. Similarly to the load control device 1a, the load control device 1b to the load control device 1e control the load of the connection destination based on the control signal corresponding to each load input from the integrated control device 21. For convenience of explanation, while different reference numerals are given to each load control device illustrated in FIG. 1, the load control device 1a to the load control device 1e are all load control devices 1 according to this embodiment. Similarly, in FIG. 1, while different reference numerals are given to each semiconductor device that each load control device includes and to each operation mode determination circuit that each semiconductor device includes, a semiconductor device 11a to a semiconductor device 11e are all semiconductor devices 11 that the load control devices 1 include, and an operation mode determination circuit 12a to an operation mode determination circuit 12e are all operation mode determination circuits 12 that the semiconductor devices 11 include.

The swivel motor 31 is disposed in a periphery of a headlight of a vehicle and is a motor for moving a headlight optical axis in a right-left direction. In order to move the headlight optical axis in the right-left direction, the swivel motor 31 rotates not only in a normal rotation direction but also in a reverse rotation direction. The rotation direction of the swivel motor 31 is controlled by the semiconductor device 11a included in the load control device 1a.

The tilt and telescopic motor 41 is disposed in a periphery of a steering wheel of a vehicle and is a motor for controlling a position of the steering wheel. The tilt and telescopic motor 41 includes a tilt motor 42 and a telescopic motor 43. The tilt motor 42 is a motor for adjusting a position of the steering wheel in an up-down direction. In order to adjust the position of the steering wheel in the up direction and in the down direction, the tilt motor 42 rotates not only in a normal rotation direction but also in a reverse rotation direction. The telescopic motor 43 is a motor for adjusting the position of the steering wheel in a front-rear direction. In order to adjust the position of the steering wheel in the front direction and in the rear direction, the telescopic motor 43 rotates not only in a normal rotation direction but also in a reverse rotation direction. The rotation directions of the tilt motor 42 and the telescopic motor 43 are controlled by the semiconductor device 11b included in the load control device 1b.

The power seat motor 51 is disposed in a periphery of a seat of a vehicle and is a motor for inclining a reclining mechanism of the seat in the front-rear direction. In order to incline the reclining mechanism of the seat in the front direction and in the rear direction, the power seat motor 51 rotates not only in a normal rotation direction but also in a reverse rotation direction. The rotation direction of the power seat motor 51 is controlled by the semiconductor device 11c included in the load control device 1c. The power seat motor 51 may be a motor for sliding the position of the seat to adjust it in the front-rear direction.

The side mirror motor 61 is disposed in a periphery of a side mirror of a vehicle and is a motor for controlling the side mirror. The side mirror motor 61 includes a mirror retraction motor 62, a mirror up-down adjustment motor 63, and a mirror right-left adjustment motor 64. The mirror retraction motor 62 is a motor for driving the side mirror to position it in a retraction position and a deployment position. In order to drive the side mirror in a deployment direction and a retraction direction, the mirror retraction motor 62 rotates not only in a normal rotation direction but also in a reverse rotation direction. The mirror up-down adjustment motor 63 is a motor for adjusting a mirror surface orientation of the side mirror in the up-down direction. In order to adjust the mirror surface orientation of the side mirror in the up direction and the down direction, the mirror up-down adjustment motor 63 rotates not only in a normal rotation direction but also in a reverse rotation direction. The mirror right-left adjustment motor 64 is a motor for adjusting a mirror surface orientation of the side mirror in the right-left direction. In order to adjust the mirror surface orientation of the side mirror in the left direction and the right direction, the mirror right-left adjustment motor 64 rotates not only in a normal rotation direction but also in a reverse rotation direction. The rotation directions of each of the mirror retraction motor 62, the mirror up-down adjustment motor 63, and the mirror right-left adjustment motor 64 are controlled by the semiconductor device 11d included in the load control device 1d.

The light 71 is an interior light disposed in an interior of a vehicle, what is called, a room lamp. Examples of the light 71 include, for example, a substrate type LED lamp with high versatility. Lighting-up and lighting-off of the light 71 are controlled by the semiconductor device 11e included in the load control device 1e.

The semiconductor device 11a to the semiconductor device 11e illustrated in FIG. 1 are devices manufactured by connecting a semiconductor chip with lead fames and then molding (sealing) it with resin. As described above, each of the semiconductor device 11a to the semiconductor device 11e controls the load of the connection destination. In FIG. 1, while one semiconductor device 11 is indicated for a load control device 1, the load control device 1 may include a plurality of semiconductor devices 11. The number of semiconductor devices included in the load control device 1 is not specifically limited.

Figure 2:
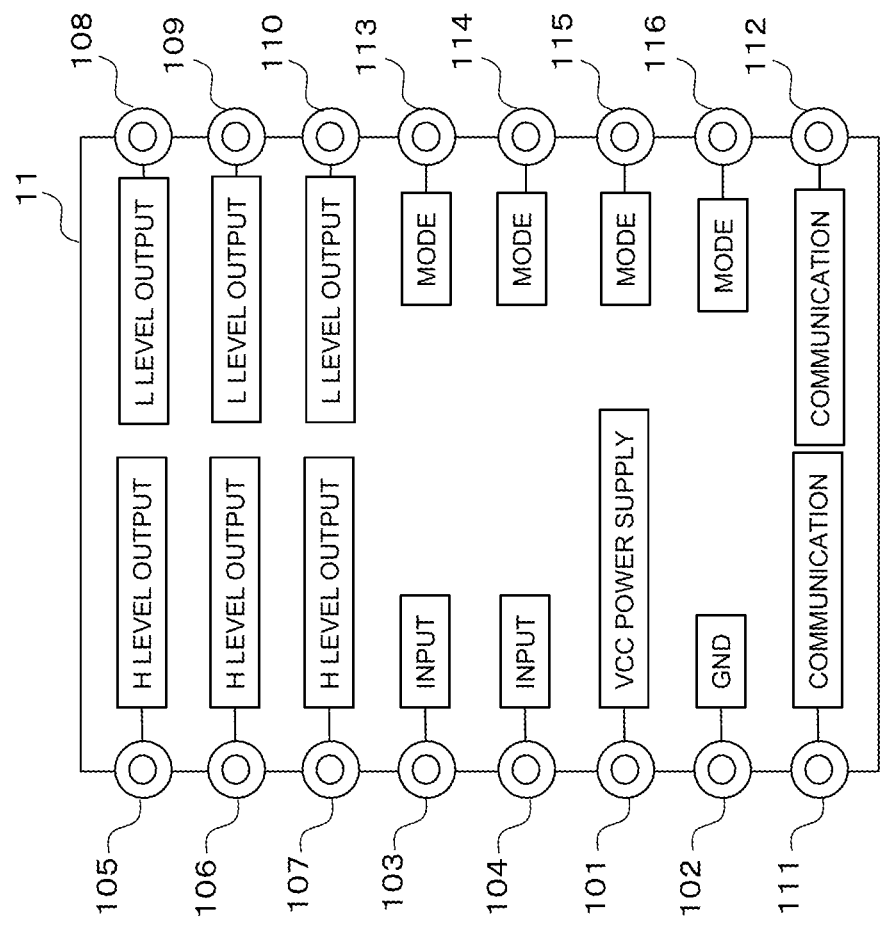
FIG. 2 is one example of a terminal configuration of a semiconductor device illustrated in FIG. 1.

FIG. 2 is one example of terminal configurations of the semiconductor device 11a to the semiconductor device 11e illustrated in FIG. 1. While the terminal configuration will be described using the semiconductor device 11, it is assumed that the terminal configurations of the semiconductor device 11a to the semiconductor device 11e are similar to the terminal configuration of the semiconductor device 11. Each terminal illustrated in FIG. 2 is a so-called external pin extracted by a lead frame for connecting the semiconductor device 11 to outside. In the example in FIG. 2, while 16 terminals are indicated as the terminals of the semiconductor device 11, the number of terminals of the semiconductor device 11 is not specifically limited. The number of terminals of the semiconductor device 11 may be more than 16 or may be less than 16.

The semiconductor device 11 includes a VCC power supply terminal 101 for supplying power to the semiconductor device 11 and a GND terminal 102 for defining GND of the semiconductor device 11. The VCC power supply terminal 101 is, for example, connected to a power supply (for example, a 5 V power supply) on a substrate on which the load control device 1 is disposed. The GND terminal 102 is, for example, connected to GND on the substrate on which the load control device 1 is disposed.

The semiconductor device 11 includes an input terminal 103 and an input terminal 104. The input terminal 103 and the input terminal 104 are connected to a load, a sensor, an Electronic Control Unit (ECU), or the like depending on the application of the load control device 1.

Figure 3:
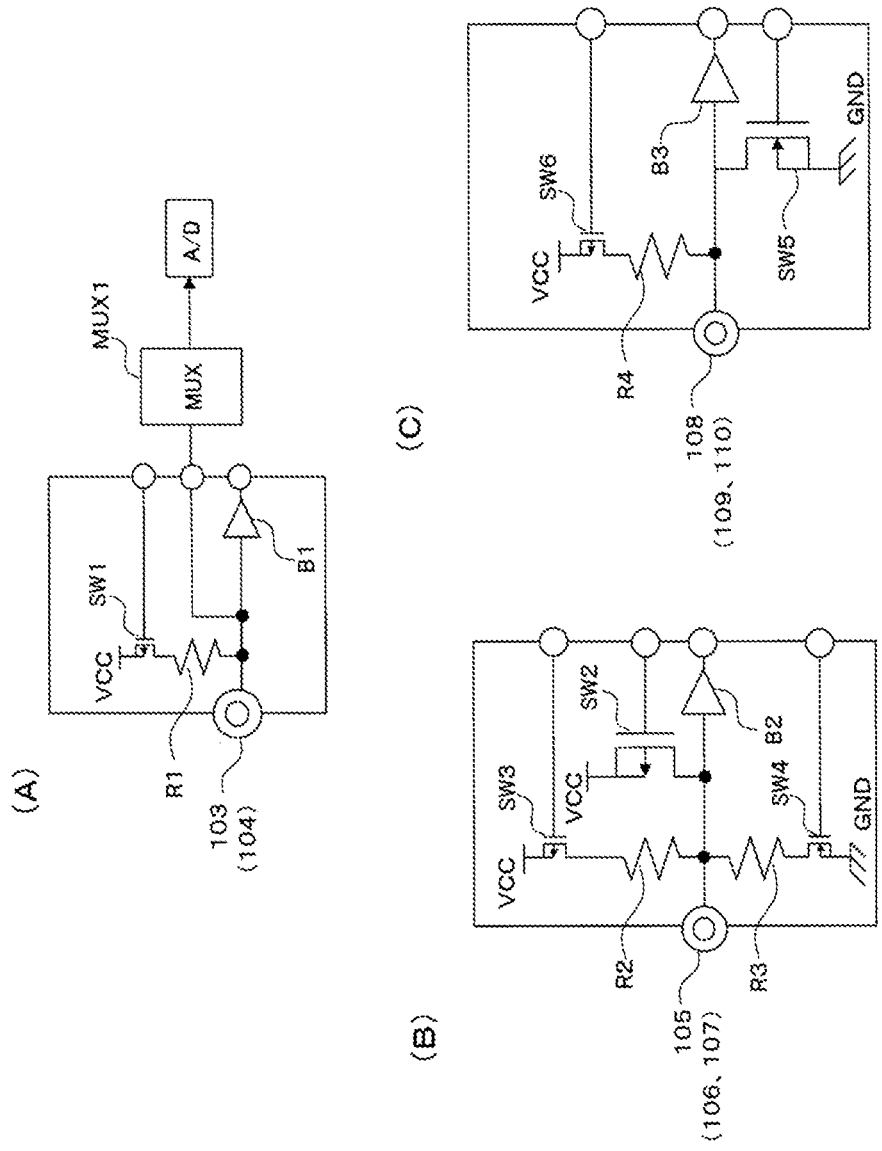
FIG. 3 illustrates examples of circuit configurations of each of input terminals, H level output terminals, and L level output terminals, which are illustrated in FIG. 2.

FIG. 3(A) is one example of circuit configurations of the input terminal 103 and the input terminal 104. While the circuit configuration will be described by taking the input terminal 103 as a representative example, it is assumed that the circuit configuration of the input terminal 104 is similar to the circuit configuration of the input terminal 103. As illustrated in FIG. 3(A), the input terminal 103 is constituted by a so-called pull-up circuit, which is a circuit that is connected to a power supply VCC via a pull-up resistor R1 when a switching element SW1 is turned on. Examples of the switching element SW1 include, for example, a Metal-Oxide Semiconductor Field Effect Transistor (MOSFET). The pull-up circuit is disposed as a countermeasure for floating of the input terminal 103. In FIG. 3(A), B1 indicates an input buffer, MUX1 indicates a multiplexer, and A/D indicates an analog/digital conversion circuit.

Returning to FIG. 2, the semiconductor device 11 includes an H level output terminal 105 to an H level output terminal 107, which can output a voltage of the power supply VCC (VCC voltage), and an L level output terminal 108 to an L level output terminal 110, which can output a voltage of GND (0 V). The H level output terminal 105 to the H level output terminal 107 and the L level output terminal 108 to the L level output terminal 110 are directly or indirectly connected to the load (the swivel motor 31 illustrated in FIG. 1 and the like).

FIG. 3(B) is one example of circuit configurations of the H level output terminal 105 to the H level output terminal 107. While the circuit configuration will be described by taking the H level output terminal 105 as a representative example, it is assumed that the circuit configurations of the H level output terminal 106 and the H level output terminal 107 are similar to the circuit configuration of the H level output terminal 105. As illustrated in FIG. 3(B), the H level output terminal 105 is constituted by a circuit that outputs the voltage of the power supply VCC when a switching element SW2 is turned on. The H level output terminal 105 can also function as an input terminal. The H level output terminal 105 is constituted by a so-called pull-up circuit, which is a circuit that is connected to the power supply VCC via a pull-up resistor R2 when a switching element SW3 is turned on. The H level output terminal 105 is constituted by a so-called pull-down circuit, which is a circuit connected to GND via a pull-down resistor R3 when a switching element SW4 is turned on. While the function of the input terminal is disposed to detect an output current or an output voltage from the load, it is only necessary that the H level output terminal 105 functions as an output terminal, and the H level output terminal 105 does not need to function as an input terminal. Examples of the switching element SW2 to the switching element SW4 include, for example, MOSFETs. In FIG. 3(B), B2 indicates an input buffer.

FIG. 3(C) is one example of circuit configurations of the L level output terminal 108 to the L level output terminal 110. While the circuit configuration will be described by taking the L level output terminal 108 as a representative example, it is assumed that the circuit configurations of the L level output terminal 109 and the L level output terminal 110 are similar to the circuit configuration of the L level output terminal 108. As illustrated in FIG. 3(C), the L level output terminal 108 is constituted by a circuit that outputs the voltage of GND when a switching element SW5 is turned on. Similarly to the H level output terminal 105, the L level output terminal 108 can also function as an input terminal. The L level output terminal 108 is constituted by a so-called pull-up circuit, which is a circuit that is connected to the power supply VCC via a pull-up resistor R4 when a switching element SW6 is turned on. Similarly to the H level output terminal 105, the L level output terminal 108 does not need to function as an input terminal. Examples of the switching element SW5 and the switching element SW6 include, for example, MOSFETs. In FIG. 3(C), B3 indicates an input buffer.

Returning to FIG. 2, the semiconductor device 11 includes a communication terminal 111 and a communication terminal 112 for communicating with the integrated control device 21. The communication terminal 111 and the communication terminal 112 are connected to the integrated control device 21 via the in-vehicle network 2 illustrated in FIG. 1. Information from the integrated control device 21 received through the communication terminal 111 and the communication terminal 112 is output to the operation mode determination circuit 12, which will be described later.

As illustrated in FIG. 2, the semiconductor device 11 includes a mode terminal 113 to a mode terminal 116 for setting a tentative operation mode of the semiconductor device 11. The mode terminal 113 to the mode terminal 116, for example, are connected to the power supply or GND on a substrate on which the load control device 1 is disposed. The functions of the mode terminal 113 to the mode terminal 116 and the tentative operation mode will be described later.

Figure 4A:
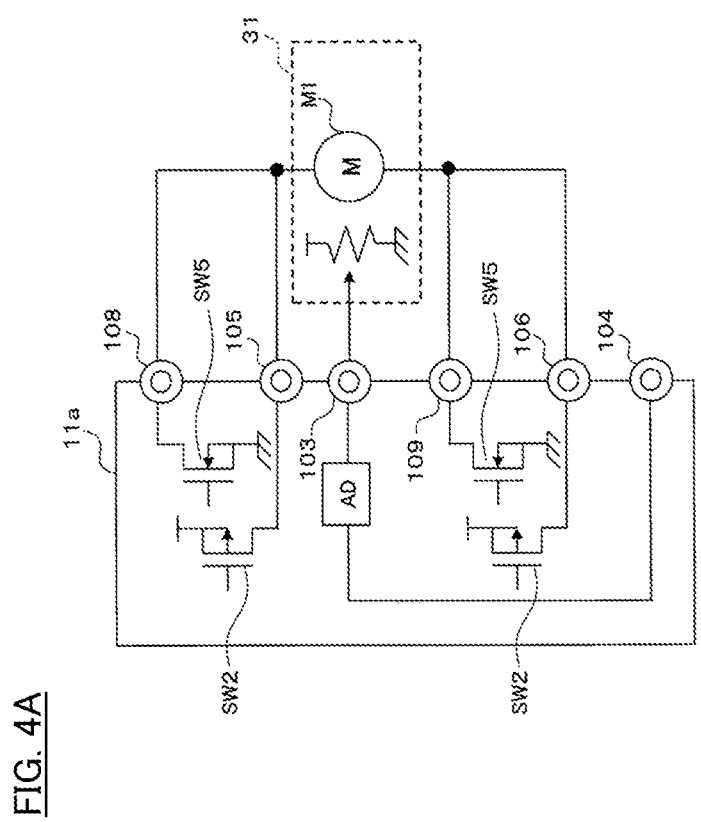
FIG. 4A is a connection example between the semiconductor device and a swivel motor, which are illustrated in FIG. 1.

Next, using FIGS. 4A to 4E, connection examples between the load control devices and the loads will be described with respect to the load control device 1a to the load control device 1e illustrated in FIG. 1. FIG. 4A is the connection example between the semiconductor device 11a and the swivel motor 31 illustrated in FIG. 1. As illustrated in FIG. 4A, in a case of the swivel motor 31 including a motor M1, one semiconductor device 11a is used for the swivel motor 31. The H level output terminal 105 and the L level output terminal 108 are connected to one terminal of the motor M1, and the H level output terminal 106 and the L level output terminal 109 are connected to the other terminal of the motor M1. The motor M1 rotates in the normal rotation direction or the reverse rotation direction according to an output voltage level of the semiconductor device 11a. Other terminals of the semiconductor device 11a that are not illustrated in FIG. 4A are not connected to the swivel motor 31. In FIG. 4A and FIGS. 4B to 4E that will be described later, the switching element SW2 corresponds to the switching element SW2 illustrated in FIG. 3(B), and the switching element SW5 corresponds to the switching element SW5 illustrated in FIG. 3(C).

Figure 4B:
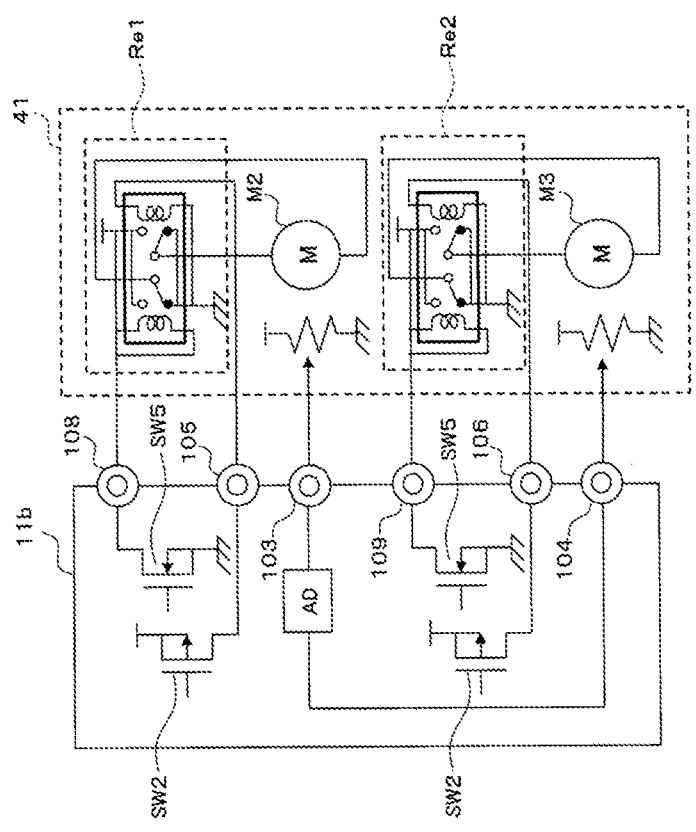
FIG. 4B is a connection example between the semiconductor device and a tilt and telescopic motor, which are illustrated in FIG. 1.

FIG. 4B is the connection example between the semiconductor device 11b and the tilt and telescopic motor 41 illustrated in FIG. 1. As illustrated in FIG. 4B, in a case of the tilt and telescopic motor 41 including a motor M2 and a motor M3, one semiconductor device 11*b* is used for the tilt and telescopic motor 41. The H level output terminal 105 and the L level output terminal 108 are connected to the motor M2 via a relay Re1, and the H level output terminal 106 and the L level output terminal 109 are connected to the motor M3 via a relay Re2. Since a current flowing through the motor M2 and the motor M3 (the tilt and telescopic motor 41) is larger than the current flowing through the motor M1 (the swivel motor 31) illustrated in FIG. 4A, the semiconductor device 11*b* is connected to the motor M2 via the relay Re1 and is connected to the motor M3 via the relay Re2. The relay Re1 changes the rotation direction of the motor M2 according to an output voltage of the semiconductor device 11*b*, and the relay Re2 changes the rotation direction of the motor M3 according to the output voltage of the semiconductor device 11*b*. Namely, the motor M2 and the motor M3 rotate in the normal rotation direction or the reverse rotation direction according to the output voltage of the semiconductor device 11*b*. Other terminals of the semiconductor device 11*b* that are not illustrated in FIG. 4B are not connected to the tilt and telescopic motor 41.

Figure 4C:
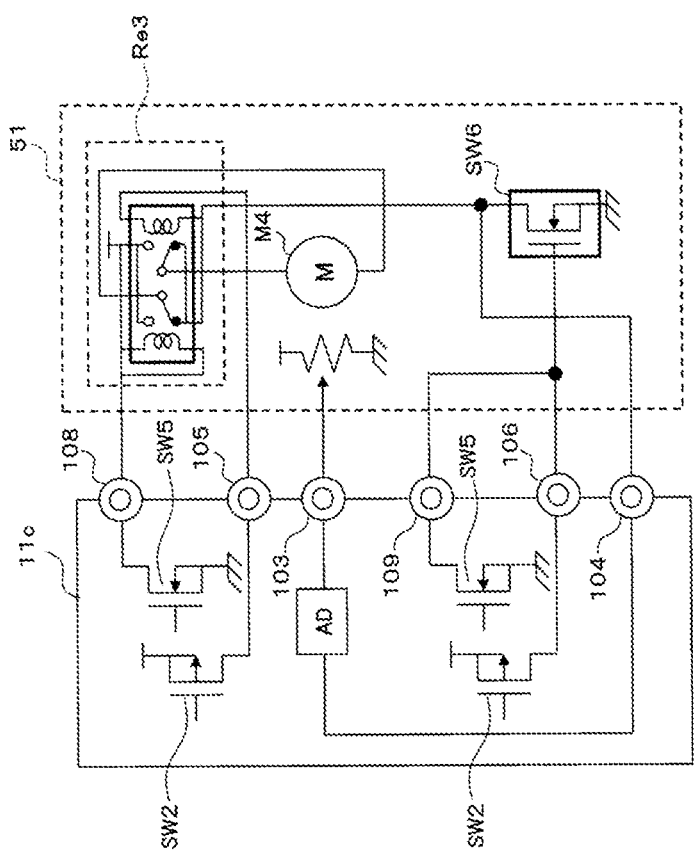
FIG. 4C is a connection example between the semiconductor device and a power seat motor, which are illustrated in FIG. 1.

FIG. 4C is the connection example between the semiconductor device 11*c* and the power seat motor 51 illustrated in FIG. 1. As illustrated in FIG. 4C, in a case of the power seat motor 51 including a motor M4, one semiconductor device 11*c* is used for the power seat motor 51. The H level output terminal 105 and the L level output terminal 108 are connected to the motor M4 via a relay Re3, and the H level output terminal 106 and the L level output terminal 109 are connected to the motor M4 via the switching element SW6 and the relay Re3. The relay Re3 changes the rotation direction of the motor M4 according to an output voltage level of the semiconductor device 11*c*, and the relay Re3 changes the rotation direction of the motor M4 according to on or off of the switching element SW6. The switching element SW6 turns on or turns off according to the output voltage level of the semiconductor device 11*c*. Namely, the motor M4 rotates in the normal rotation direction or the reverse rotation direction according to the output voltage level of the semiconductor device 11*c*. Other terminals of the semiconductor device 11*c* that are not illustrated in FIG. 4C are not connected to the power seat motor 51.

Figure 4D:
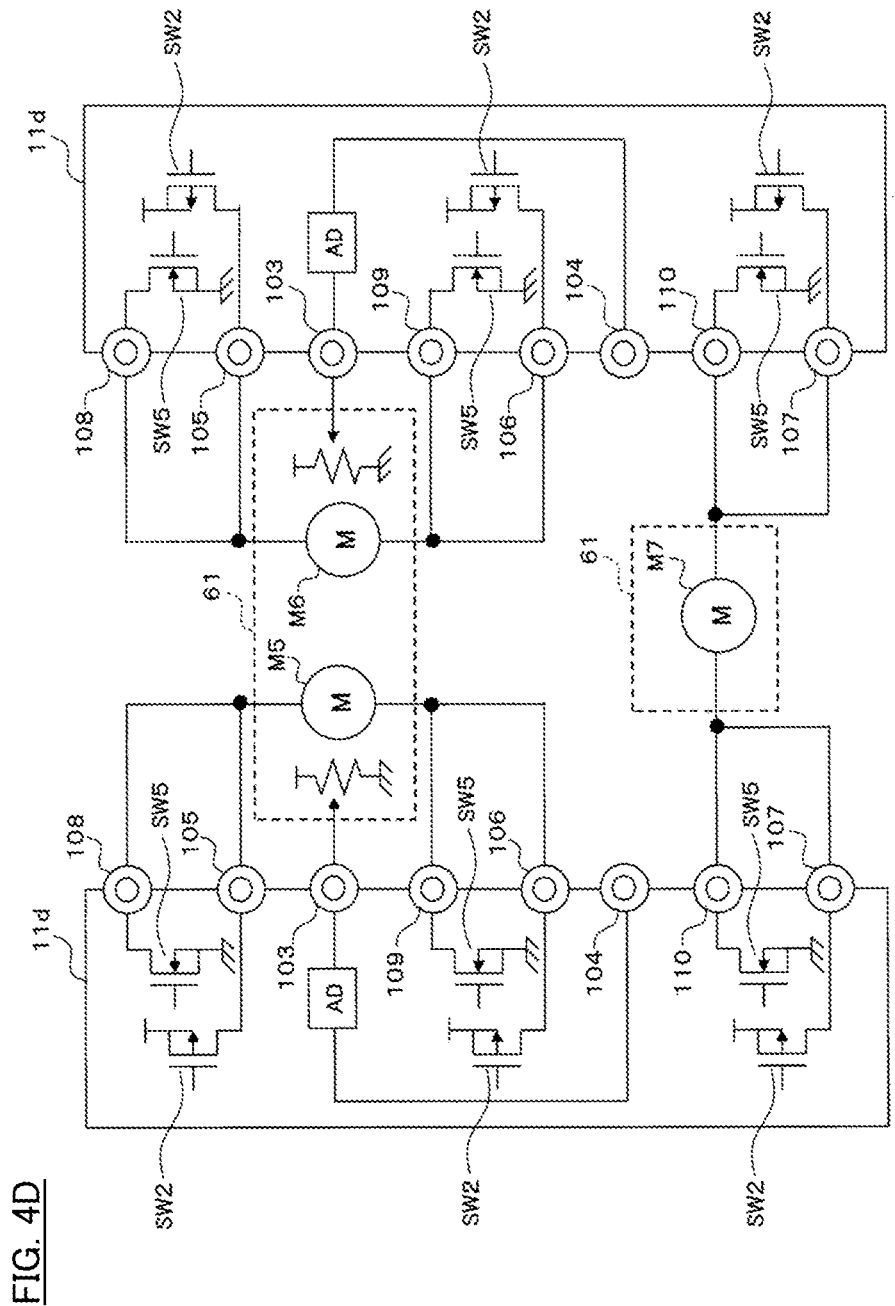
FIG. 4D is a connection example between the semiconductor device and a side mirror motor, which are illustrated in FIG. 1.

FIG. 4D is the connection example between the semiconductor device 11*d* and the side mirror motor 61 illustrated in FIG. 1. As illustrated in FIG. 4D, in a case of the side mirror motors 61 including a motor M5 to a motor M7, two semiconductor devices 11*d* are used for the side mirror motors 61. With respect to the semiconductor device 11*d* on a left side in a front view in FIG. 4D, the H level output terminal 105 and the L level output terminal 108 are connected to one terminal of the motor M5, the H level output terminal 106 and the L level output terminal 109 are connected to the other terminal of the motor M5, and the H level output terminal 107 and the L level output terminal 110 are connected to one terminal of the motor M7. With respect to the semiconductor device 11*d* on a right side in a front view in FIG. 4D, the H level output terminal 105 and the L level output terminal 108 are connected to one terminal of the motor M6, the H level output terminal 106 and the L level output terminal 109 are connected to the other terminal of the motor M6, and the H level output terminal 107 and the L level output terminal 110 are connected to the other terminal of the motor M7. The motor M5 to the motor M7 rotate in the normal rotation direction or the reverse rotation direction according to the output voltage level of the semiconductor devices 11*d*. Other terminals of the semiconductor devices 11*d* that are not illustrated in FIG. 4D are not connected to the side mirror motors 61.

Figure 4E:
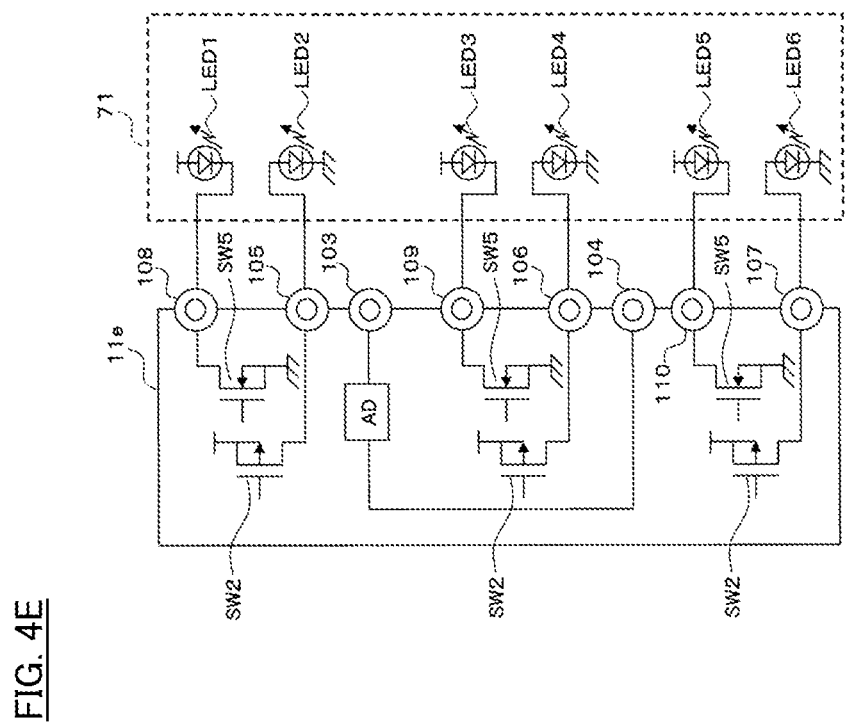
FIG. 4E is a connection example between the semiconductor device and a light, which are illustrated in FIG. 1.

FIG. 4E is the connection example between the semiconductor device 11*e* and the light 71 illustrated in FIG. 1. As illustrated in FIG. 4E, in a case of the light 71 including an LED 1 to an LED 6, one semiconductor device 11*e* is used for the light 71. One LED is connected to each output terminal of the semiconductor device 11*e*. Specifically, the H level output terminal 105 is connected to the LED 2, the H level output terminal 106 is connected to the LED 4, and the H level output terminal 107 is connected to the LED 6. The L level output terminal 108 is connected to the LED 1, the L level output terminal 109 is connected to the LED 3, and the L level output terminal 110 is connected to the LED 5. The LED 1 to the LED 6 each light up or light off according to a voltage level output from the output terminal of the connection destination. Other terminals of the semiconductor device 11*e* that are not illustrated in FIG. 4E are not connected to the light 71.

Figure 5A:
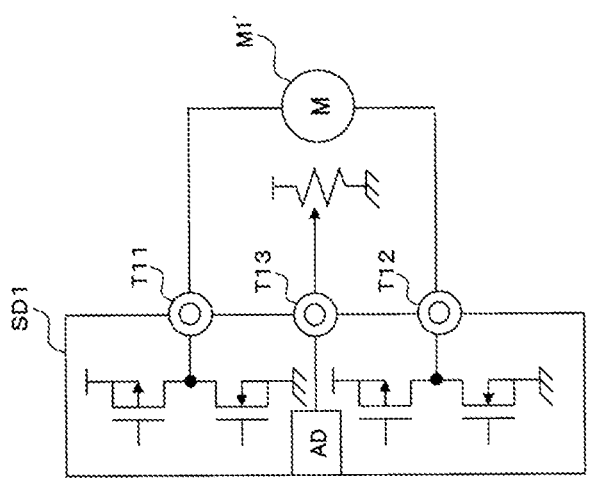
FIG. 5A is a connection example between a semiconductor device and a load according to a comparative example.
Figure 5B:
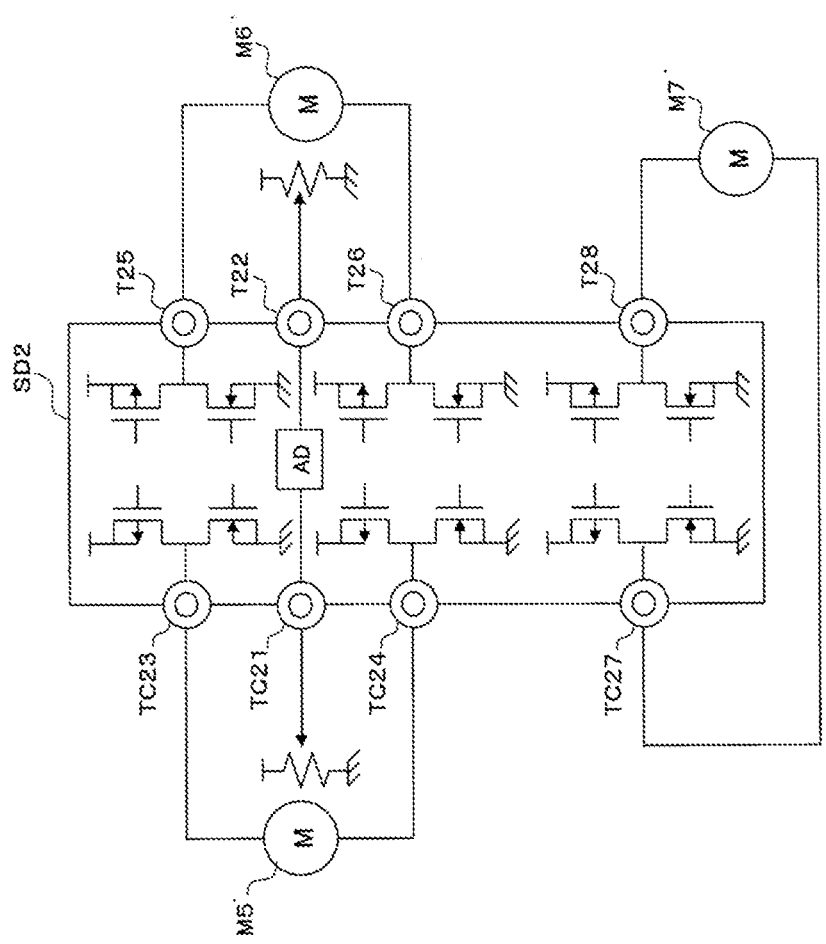
FIG. 5B is a connection example between a semiconductor device and a load according to a comparative example.
Figure 5C:
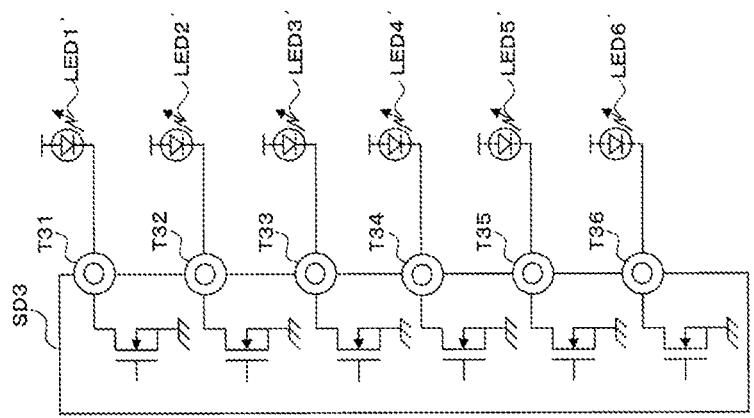
FIG. 5C is a connection example between a semiconductor device and a load according to a comparative example.

As illustrated in FIGS. 4A to 4E, since the circuit configuration of the load and the number of terminals connected to the semiconductor device of the load differ depending on the type of load, it is also conceivable to use the semiconductor device depending on the type of load. Here, the semiconductor devices depending on the type of load will be described using FIGS. 5A to 5C. FIGS. 5A to 5C are connection examples between the semiconductor devices and the loads according to comparative examples.

For example, as illustrated in FIG. 5A, as a semiconductor device for controlling a motor M1', such as the swivel motor 31, a semiconductor device SD1 according to the comparative example can also be used. While the semiconductor device SD1 differs from the semiconductor device 11*a* of the embodiment in the circuit configuration of an output stage and the terminals connected to the motor M1' (see FIG. 4A), it can control the motor M1' in the same way as the semiconductor device 11*a* controls the motor M1.

For example, as illustrated in FIG. 5B, as a semiconductor device for controlling a motor M5' to a motor M7', such as the side mirror motor 61, a semiconductor device SD2 according to the comparative example can also be used. The semiconductor device SD2 differs from the semiconductor device SD1 in the circuit configuration of the output stage and the number of terminals connected to the load. While the semiconductor device SD2 differs from the semiconductor device 11*d* of the embodiment in the circuit configuration of the output stage and the terminals connected to the motor M5' to the motor M7' (see FIG. 4D), it can control the motor M5' to the motor M7' in the same way as the semiconductor device 11*d* controls the motor M5 to the motor M7.

For example, as illustrated in FIG. 5C, as a semiconductor device for controlling an LED 1' to an LED 6', such as the light 71, a semiconductor device SD3 according to the comparative example can also be used. The semiconductor device SD3 differs from the semiconductor device SD1 and the semiconductor device SD2 in the circuit configuration of the output stage and the number of terminals connected to the load. While the semiconductor device SD3 differs from the semiconductor device 11*e* of the embodiment in the circuit configuration of the output stage and the terminals connected to the LED 1' to the LED 6' (see FIG. 4E), it can control the LED 1' to the LED 6' in the same way as the semiconductor device 11*e* controls the LED 1 to the LED 6.

As described using FIGS. 5A to 5C, it is also possible to control the load by changing the semiconductor device depending on the type of load. However, when different types of semiconductor devices are used for each load, there is a problem that the number of types of semiconductor devices increases, and its device management becomes complicated. In view of such a problem, this embodiment uses the semiconductor device 11 that has the circuit configuration of the output stage in which the H level outputs and the L level outputs can be individually controlled (see FIG. 3(B) and FIG. 3(C)) and can output the H level voltage from the H level terminal and the L level voltage from the L level terminal (see FIG. 2). With this, as illustrated in FIGS. 4A to 4E, even when the types of loads are different, each load can be controlled by the same type of the semiconductor device 11. Consequently, the types of semiconductor devices for controlling the loads can be reduced, and the complexity of the device management can be eliminated.

On the other hand, when the same type of semiconductor device 11 is used regardless of the types of loads, there is a concern that the semiconductor device is likely to malfunction due to differences in control according to the types of loads. For example, in the connection example in FIG. 4A, in order to suppress a through-current, the semiconductor device 11a needs control not to simultaneously turn on the switching element SW2 and the switching element SW5. On the other hand, in the connection example in FIG. 4E, in order to light up the LED 1 to the LED 6, the semiconductor device 11e needs control to simultaneously turn on the switching element SW2 and the switching element SW5. For example, in the connection example in FIG. 4A, when the semiconductor device 11a performs the control for the light 71 illustrated in FIG. 4E instead of the control for the swivel motor 31, the semiconductor device 11a is likely to be damaged by the through-current. In this embodiment, in order to suppress malfunction of the semiconductor device 11 that is highly versatile and has a plurality of operation modes depending on the application, the load control device 1 determines the operation mode of the semiconductor device 11 corresponding to the load of the connection destination using the information transmitted from the integrated control device 21.

The integrated control device 21 will be described. The integrated control device 21 is an Electronic Control Unit (ECU) that outputs operation mode information to the load control device 1 and manages the operation modes of the load control device 1. The integrated control device 21 is constituted of a microprocessor 22 that outputs the control signal for controlling the loads to the load control device 1 and controls each load and a communication device 23.

The operation mode information will be described by taking the load control device 1a illustrated in FIG. 1 as an example. The operation mode information includes information that can identify each operation mode (for example, numerical values predetermined corresponding to each operation mode), information specific to the operation mode (for example, prohibited matters on the switching element that do not cause the switching element SW2 and the switching element SW5 to be simultaneously turned on), and the like. A plurality of operation modes for controlling each load are stored in a non-volatile memory such as a ROM. The integrated control device 21 reads out the operation mode for the swivel motor 31 from the non-volatile memory. The integrated control device 21 outputs the operation mode information including the operation mode for the swivel motor 31 to the load control device 1a. The integrated control device 21 executes processing similar to the processing executed to the load control device 1a with respect to the load control device 1b to the load control device 1e. For convenience of explanation, in order to distinguish it from the tentative operation mode set by the operation mode determination circuit 12, the operation mode of the semiconductor device 11 set by the integrated control device 21 will be referred to as an external setting operation mode to be described.

A method for determining the operation mode of the semiconductor device 11 will be described. The operation mode of the semiconductor device 11 is determined by the operation mode determination circuit 12 included in the semiconductor device 11. The operation mode determination circuit 12 has a function of comparing a tentative operation mode for determining an operation mode with the operation mode information obtained via the communication and determines the operation mode based on the comparison result. When a result that is inappropriate for the tentative operation mode including a mismatch in the comparison result is obtained, the operation mode determination circuit 12 can stop all the output controls to the respective loads without determining the operation mode.

The operation mode determination circuit 12 sets the tentative operation mode indicating the operation mode before the determination, obtains the operation mode information from the integrated control device 21 via the communication, and determines the operation mode of the semiconductor device 11 based on the obtained operation mode information and the tentative operation mode. In this embodiment, the operation mode determination circuit 12 sets the tentative operation mode based on the voltage levels of the mode terminal 113 to the mode terminal 116 of the semiconductor device 11.

For example, in the semiconductor device 11a illustrated in FIG. 1, when the mode terminal 113 to the mode terminal 116 are connected to GND on the substrate, the operation mode determination circuit 12 detects that the voltages at the mode terminal 113 to the mode terminal 116 are at the L level and recognizes that a 4-bit code set by the mode terminal 113 to the mode terminal 116 is "0000." When the 4-bit code is associated with each operation mode, the operation mode determination circuit 12 sets the operation mode corresponding to the code "0000" as the tentative operation mode of the semiconductor device 11a. For example, when the operation mode associated with the code "0000" is the operation mode for the swivel motor 31, the operation mode determination circuit 12 sets the operation mode for the swivel motor 31 as the tentative operation mode of the semiconductor device 11a.

The operation mode determination circuit 12 determines the operation mode of the semiconductor device 11 by comparing the tentative operation mode, which is set, and the external setting operation mode included in the operation mode information. Specifically, when the tentative operation mode and the external setting operation mode match, the operation mode determination circuit 12 determines the tentative operation mode as the operation mode of the semiconductor device 11. For example, when a signal indicating the tentative operation mode and a signal indicating the external setting operation mode match, or when a numerical value indicating the tentative operation mode and a numerical value indicating the external setting operation mode match, the operation mode determination circuit 12 determines the tentative operation mode as the operation mode of the semiconductor device 11. On the other hand, when the tentative operation mode and the external setting operation mode do not match, the operation mode determination circuit 12 does not determine the operation mode of the semiconductor device 11. For example, when a signal indicating the tentative operation mode and a signal indicating the external setting operation mode do not match, or when a numerical value indicating the tentative operation mode and a numerical value indicating the external setting operation mode do not match, the operation mode determination circuit 12 does not determine the tentative operation mode as the operation mode of the semiconductor device 11.

In the semiconductor device 11a illustrated in FIG. 1, consider a case where an operation mode information including the operation mode for the swivel motor 31 is input to the operation mode determination circuit 12 from the integrated control device 21. For example, when the tentative operation mode of the semiconductor device 11a is set to the operation mode for the swivel motor 31, since the external setting operation mode included in the operation mode information and the tentative operation mode match, the mode determination circuit 12 determines the operation mode for the swivel motor 31 as the operation mode of the semiconductor device 11a. In this case, since the semiconductor device 11a can control the swivel motor 31, the operation mode determination circuit 12 outputs a signal requesting a start of control to the integrated control device 21. The integrated control device 21 generates the control signal for the semiconductor device 11a according to the determined operation mode for the swivel motor 31 and outputs the generated control signal to the load control device 1a. Examples of the control signal include, for example, a signal that turns on or off the switching element SW2 and the switching element SW5 in the output stage. The swivel motor 31 starts to be driven by the signal output from the semiconductor device 11a.

For example, when the tentative operation mode of the semiconductor device 11a is set to the operation mode for the light 71, since the external setting operation mode included in the operation mode information and the tentative operation mode do not match, the mode determination circuit 12 does not determine the operation mode of the semiconductor device 11a. In this case, since it is impossible to control the swivel motor 31 by the semiconductor device 11a, the operation mode determination circuit 12 outputs a signal requesting a stop of control to the integrated control device 21. Examples of reasons why the external setting operation mode and the tentative operation mode do not match include, for example, a case where the operation mode determination circuit 12 sets an incorrect tentative operation mode when the voltages of the mode terminal 113 to the mode terminal 116 become intermediate voltages between the power supply voltage and GND due to poor contact between the mode terminal 113 to the mode terminal 116 and the substrate or the like. While, as processing of the operation mode determination circuit 12 after a comparison result of disagreement is obtained, the description has been given by taking the processing of outputting the signal requesting the stop of control to the integrated control device 21 as an example, the operation mode determination circuit 12 may execute other processing. For example, the operation mode determination circuit 12 may repeatedly compare the external setting operation mode and the tentative operation mode a predetermined number of times. The operation mode determination circuit 12 may control a circuit of the output stage of the semiconductor device 11 so as to stop the output relative to the load of the connection destination. The operation mode determination circuit 12 may control the circuit of the output stage of the semiconductor device 11 so as not to execute the output control relative to the load of the connection destination.

As described above, the load control device 1 according to the embodiment has a plurality of operation modes depending on the applications and includes the semiconductor device 11 that is electrically connected to the load. The semiconductor device 11 has the operation mode determination circuit 12. The operation mode determination circuit 12 sets the tentative operation mode indicating the operation mode before determination, obtains the operation mode information regarding the operation mode via the communication, and determines the operation mode of the semiconductor device 11 based on the obtained operation mode information and the tentative operation mode. Since the operation mode of the semiconductor device 11 can be determined using the operation mode information obtained externally before the semiconductor device 11 is driven according to the operation mode, it is possible to suppress the semiconductor device 11 having a plurality of functions depending on the applications from malfunctioning.

In the embodiment, the operation mode information includes the external setting operation mode indicating the operation mode of the semiconductor device 11 set by the integrated control device 21. The operation mode determination circuit 12 determines the operation mode of the semiconductor device 11 by comparing the tentative operation mode and the external setting operation mode. Since the operation mode of the semiconductor device 11 is determined by a relatively easy method of comparing two modes, a computation load on the operation mode determination circuit 12 can be reduced. A circuit size of the operation mode determination circuit 12 can be reduced, and as a result, cost of the semiconductor device 11 can be reduced.

In the embodiment, when the tentative operation mode and the external setting operation mode match, the operation mode determination circuit 12 determines the tentative operation mode as the operation mode of the semiconductor device 11, and when the tentative operation mode and the external setting operation mode do not match, the operation mode determination circuit 12 does not determine the operation mode of the semiconductor device 11. It is possible to easily determine whether or not the setting of the tentative operation mode is correct, and the computation load on the operation mode determination circuit 12 can be reduced. The circuit size of the operation mode determination circuit 12 can be reduced, and as a result, the cost of the semiconductor device 11 can be reduced.

In the modification of the embodiment, when the tentative operation mode and the external setting operation mode do not match, the operation mode determination circuit 12 does not execute the output control to the load from the semiconductor device 11. It is possible to suppress the load from operating before the operation mode of the semiconductor device 11 is determined, and thus, malfunction of the load can be suppressed.

In the embodiment, the semiconductor device 11 includes the mode terminal 113 to the mode terminal 116 for setting the tentative operation mode, and the operation mode determination circuit 12 sets the tentative operation mode based on the voltages of the mode terminal 113 to the mode terminal 116. For example, when the mode terminal 113 to the mode terminal 116 are connected to the power supply or GND on the substrate, since the voltages at the mode terminals have relatively little variation even when surrounding conditions of the load control device 1 change, the tentative operation mode can be appropriately set even when the surrounding conditions change.

In the embodiment, the semiconductor device 11 is a semiconductor device constituted of the switching elements. The switching element is a MOSFET. Even when the semiconductor device 11 is constituted of the MOSFET switching elements where the through-current countermeasures are required, generation of the through-current due to malfunction can be suppressed. It is possible to suppress an overvoltage due to malfunction of the semiconductor device 11 from being applied to the load or an overcurrent due to malfunction of the semiconductor device 11 from flowing through the load.

The load control system 100 according to the embodiment includes the load control device 1 and the loads (the swivel motor 31, the tilt and telescopic motor 41, the power seat motor 51, the side mirror motor 61, and the light 71). As illustrated in FIG. 4A, in the load control system 100, when a current flowing through the load is less than a predetermined current value, the semiconductor device 11 is directly connected to the load. As illustrated in FIG. 4B, in the load control system 100, when the current flowing through the load is equal to or more than the predetermined current value, the semiconductor device 11 is indirectly connected to the load via the relay. Since the connection configuration with the load can be changed depending on the type of load, the load control system 100 with high versatility can be provided.

In the embodiment, the load control system 100 includes the integrated control device 21 that outputs the operation mode information to the load control device 1 and controls the semiconductor device 11 according to the determined operation mode of the semiconductor device 11. Even when a plurality of loads are disposed in various locations, control for each load can be consolidated in the integrated control device 21. Since the number and types of integrated control devices can be reduced, a range in which electrical components such as the loads can be disposed can be expanded, and a degree of freedom in layout design can be increased.

Note that the embodiment described above are described for ease of understanding of the present invention and are not described to limit the present invention. Accordingly, each element disclosed in the above-described embodiment is intended to include all design changes and equivalents that fall within the technical scope of the present invention.

For example, in the above-described embodiment, as a method of determining the operation mode of the semiconductor device 11, the method by comparing the tentative operation mode and the external setting operation mode has been described, the operation mode of the semiconductor device 11 may be determined by other methods. For example, the operation mode determination circuit 12 may determine whether or not the setting result of the tentative operation mode is correct using the operation mode information including information other than the external setting operation mode and determine the operation mode of the semiconductor device 11 based on the determination result. Specifically, when the setting result of the tentative operation mode is determined to be correct, the operation mode determination circuit 12 determines the tentative operation mode as the operation mode of the semiconductor device 11, and when the setting result of the tentative operation mode is determined to be incorrect (when an error is determined to be present in the setting result of the tentative operation mode), the operation mode determination circuit 12 does not determine the operation mode of the semiconductor device 11. For example, error detection techniques such as a checksum can be used. The operation mode information that the integrated control device 21 outputs to the load control device 1 is not limited to the external setting operation mode and may also be an error detection code for detecting errors in the tentative operation mode. For example, the integrated control device 21 may generate a summed value of each bit (the error detection code) for the code indicating the tentative operation mode as the operation mode information and output the generated operation mode information to the load control device 1. After setting the tentative operation mode, the operation mode determination circuit 12 computes the summed value of each bit for the code indicating the tentative operation mode and compares the summed value included in the operation mode information with the computed summed value. When the summed values match, the operation mode determination circuit 12 determines that the setting result of the tentative operation mode is correct, and when the summed values do not match, the operation mode determination circuit 12 determines that the setting result of the tentative operation mode is incorrect. It is possible to easily determine whether or not the setting of the tentative operation mode is correct, and the computation load on the operation mode determination circuit 12 can be reduced. The circuit size of the operation mode determination circuit 12 can be reduced, and the size of the semiconductor device 11 can be reduced. As a result, the substrate size with which the semiconductor device 11 is provided can also be reduced, and the degree of freedom in the layout design in the load control system 100 can be increased. When the summed values are determined not to match and the setting result of the tentative operation mode is incorrect, the operation mode determination circuit 12 does not execute the output control to the load at the connection destination, similarly to the modification of the above-described embodiment. It is possible to suppress the load from operating before the operation mode of the semiconductor device 11 is determined, and the malfunction of the load can be suppressed.

In the above-described embodiment, as a method for setting the tentative operation mode of the semiconductor device 11, the method based on the voltages of the mode terminal 113 to the mode terminal 116 has been described, the tentative operation mode of the semiconductor device 11 may be determined by other methods. The tentative operation mode may be stored in an Electrically Erasable Programmable Read-Only Memory (EEPROM) with relatively low capacity, which is a type of non-volatile memory. By reading out the tentative operation mode from the EEPROM, the operation mode determination circuit 12 may set the tentative operation mode of the semiconductor device 11. In a case of the setting method, the tentative operation mode corresponding to the load as a control target is preliminarily stored in the EEPROM for each load control device. Since the tentative operation mode can be set without disposing the mode terminals in the semiconductor device 11, the size of the semiconductor device 11 can be reduced. As a result, the substrate size on which the semiconductor device 11 is disposed can also be reduced, and the degree of freedom in the layout design in the load control system 100 can be increased. The EEPROM may be any type of a type incorporated into the operation mode determination circuit 12 or a type externally attached to the operation mode determination circuit 12. As the other setting method, the operation mode determination circuit 12 may determine whether or not the output terminal of the semiconductor device 11 is connected to the load based on the input current from the load, and then determine the tentative operation mode depending on the number of output terminals connected to the load, magnitude of the input current from the load, or a combination of these.

In the above-described embodiment, while the description has been given by taking the configuration in which the semiconductor device 11 includes the operation mode determination circuit 12 as an example, the load control device 1 may include the operation mode determination circuit 12 separately from the semiconductor device 11. The load control system 100 may include the operation mode determination circuit 12 separately from the load control device 1.

In the above-described embodiment, the description has been given by taking the configuration of one integrated control device 21 as an example in the load control system 100, a plurality of integrated control devices 21 may be disposed depending on the type of load, the function of the load, and the like.

In the above-described embodiment, as the power supply terminal of the semiconductor device 11, the description has been given by taking one VCC power supply terminal 101 as an example, the semiconductor device 11 may have a plurality of power supply terminals. For example, for the H level output terminal 105 to the H level output terminal 107, the semiconductor device 11 may have the power supply terminals for the H level voltage according to the input voltage of the load. For example, for the input terminal 103 and the input terminal 104, the semiconductor device 11 may have the power supply terminals for the pull-up power supply.

In the above-described embodiment, while the description has been given by taking the configuration in which the load control device 1 controls the loads such as a motor and a LED as an example, the load control device 1 may function as part of the load. For example, the load control device 1 may function as a switch or a relay by using the semiconductor device 11 constituted of switching elements. Examples of switches include, for example, a combination switch, a steering switch, and the like for a vehicle. Examples of relays include, for example, an ACC relay, a power socket relay, an IGN (ignition) relay, a blower fan motor relay, and the like for a vehicle.

In the above-described embodiment, while the description has been given by taking the configuration in which the load control system 100 is mounted on a vehicle as an example, the load control system 100 may be disposed in an object other than a vehicle. For example, the load control system 100 may be disposed in an industrial machine other than a vehicle.

DESCRIPTION OF REFERENCE NUMERALS

100 . . . Load control system
   1a to 1e . . . Load control device
      11a to 11e . . . Semiconductor device
         12a to 12e . . . Operation mode determination circuit
   2 . . . In-vehicle network
   21 . . . Integrated control device
      22 . . . Microprocessor
      23 . . . Communication device
   31 . . . Swivel motor
   41 . . . Tilt and telescopic motor
      42 . . . Tilt motor
      43 . . . Telescopic motor
   51 . . . Power seat motor
   61 . . . Side mirror motor
      62 . . . Mirror retraction motor
      63 . . . Mirror up-down adjustment motor
      64 . . . Mirror right-left adjustment motor
   71 . . . Light

What is claimed is:

1. A load control device comprising
a device that has a plurality of operation modes depending on applications and is electrically connected to a load, wherein
the device includes an operation mode determination circuit and a terminal for setting a tentative operation mode, and
the operation mode determination circuit is configured to:
set, based on a voltage of the terminal, the tentative operation mode indicating the operation mode before determination;
obtain operation mode information regarding the operation mode via communication, the operation mode information including an error detection code for detecting an error of the tentative operation mode;
determine whether or not a setting result of the tentative operation mode is correct using the error detection code; and
determine the operation mode of the device based on a determination result.

2. The load control device according to claim 1, wherein the operation mode determination circuit is configured:
to determine the tentative operation mode as the operation mode of the device when the setting result is determined to be correct; and
not to determine the operation mode of the device when the setting result is determined to be incorrect.

3. The load control device according to claim 2, wherein the operation mode determination circuit does not execute an output control to the load from the device when the setting result is determined to be incorrect.

4. The load control device according to claim 1, wherein the device includes a storage unit storing the tentative operation mode, and
the operation mode determination circuit sets the tentative operation mode by reading out the tentative operation mode from the storage unit.

5. The load control device according to claim 1, wherein the device is a semiconductor device constituted of a switching element.

6. The load control device according to claim 5, wherein the switching element is a MOSFET.

7. A load control system comprising:
the load control device according to claim 1; and
the load, wherein
the device is directly connected to the load when a current flowing through the load is less than a predetermined current value, and
the device is indirectly connected to the load when the current flowing through the load is equal to or more than the predetermined current value.

8. The load control system according to claim 7, further comprising
an integrated control device that outputs the operation mode information to the load control device and controls the device according to the determined operation mode of the device.

9. A load control device comprising
a device that has a plurality of operation modes depending on applications and is electrically connected to loads including a motor and a light, wherein
the device includes an operation mode determination circuit and a terminal for setting a tentative operation mode, and the operation mode determination circuit is configured to:
  set, based on a voltage of the terminal, the tentative operation mode indicating the operation mode before determination;
  obtain operation mode information regarding the operation mode via communication; and
  determine the operation mode of the device based on the obtained operation mode information and the tentative operation mode.

10. The load control device according to claim 9, wherein the operation mode information includes an external setting operation mode indicating the operation mode of the device that is set by other than the operation mode determination circuit, and
the operation mode determination circuit determines the operation mode of the device by comparing the tentative operation mode and the external setting operation mode.

11. The load control device according to claim 10, wherein
the operation mode determination circuit is configured:
  to determine the tentative operation mode as the operation mode of the device when the tentative operation mode and the external setting operation mode match; and
  not to determine the operation mode of the device when the tentative operation mode and the external setting operation mode do not match.

12. The load control device according to claim 11, wherein
the operation mode determination circuit does not execute an output control to the load from the device when the tentative operation mode and the external setting operation mode do not match.

13. A load control device comprising
a device that has a plurality of operation modes depending on applications and is electrically connected to a load, wherein
the device includes an operation mode determination circuit, a first terminal, and a second terminal, the first terminal being connected to the load as a terminal that is allowed to output a first voltage and not allowed to output a second voltage different from the first voltage, the second terminal being connected to the load as a terminal that is allowed to output the second voltage and not allowed to output the first voltage, and
the operation mode determination circuit is configured to:
  set a tentative operation mode indicating the operation mode before determination;
  obtain operation mode information regarding the operation mode via communication;
  determine the operation mode of the device based on the obtained operation mode information and the tentative operation mode.

14. A load control method that controls a load control device including a device that has a plurality of operation modes depending on applications and is electrically connected to a load by an operation mode determination circuit, the device including a terminal for setting a tentative operation mode, the load control method comprising:
  setting, based on a voltage of the terminal, the tentative operation mode that indicates the operation mode of the device before determination;
  obtaining operation mode information regarding the operation mode via communication, the operation mode information including an error detection code for detecting an error of the tentative operation mode; and
  determining whether or not a setting result of the tentative operation mode is correct using the error detection code;
  determining the operation mode of the device based on a determination result.

* * * * *